US009619292B2

(12) United States Patent
Kodialam et al.

(10) Patent No.: US 9,619,292 B2
(45) Date of Patent: Apr. 11, 2017

(54) RESOURCE PLACEMENT IN NETWORKED CLOUD BASED ON RESOURCE CONSTRAINTS

(75) Inventors: Murali Kodialam, Marboro, NJ (US); Fang Hao, Morganville, NJ (US); T. V. Lakshman, Morganville, NJ (US); Sarit Mukherjee, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 975 days.

(21) Appl. No.: 13/459,430

(22) Filed: Apr. 30, 2012

(65) Prior Publication Data

US 2013/0290539 A1 Oct. 31, 2013

(51) Int. Cl.
*G06F 15/173* (2006.01)
*G06F 9/50* (2006.01)

(52) U.S. Cl.
CPC ...... *G06F 9/5072* (2013.01); *G06F 2209/502* (2013.01); *G06F 2209/506* (2013.01)

(58) Field of Classification Search
None
See application file for complete search history.

(56) References Cited

U.S. PATENT DOCUMENTS

| | | | | |
|---|---|---|---|---|
| 7,962,582 | B2 * | 6/2011 | Potti et al. | 709/220 |
| 7,987,262 | B2 * | 7/2011 | Tung et al. | 709/224 |
| 8,612,599 | B2 * | 12/2013 | Tung et al. | 709/226 |
| 2010/0125473 | A1 * | 5/2010 | Tung et al. | 705/7 |
| 2011/0295999 | A1 * | 12/2011 | Ferris et al. | 709/224 |
| 2013/0290536 | A1 * | 10/2013 | Dutta et al. | 709/226 |
| 2013/0304925 | A1 * | 11/2013 | Ferris et al. | 709/226 |
| 2014/0075005 | A1 * | 3/2014 | Tung et al. | 709/223 |

* cited by examiner

*Primary Examiner* — Brian P Whipple
(74) *Attorney, Agent, or Firm* — Kramer & Amado, P.C.

(57) ABSTRACT

Various exemplary embodiments relate to a method and related network node including one or more of the following: receiving, at the cloud controller, a request message including a first request for a first cloud resource; identifying a set of potential devices for providing the first cloud resource; calculating a plurality of weight values corresponding to at least a portion of the set of potential devices for providing the first cloud resource, wherein the plurality of weight values are calculated based on a plurality of delta values associated with the at least a portion of the set of potential devices; selecting a device based on the plurality of weight values to provide the first cloud resource; and updating the delta value associated with the selected device.

18 Claims, 3 Drawing Sheets

400
405 Start
410 Receive Request Message
415 Retrieve Request from Request Message
420 Retrieve Device
425 Compute Weight of Allocating Resource to Device
430 Last Device? No / Yes
435 Pick Maximum Weight Device Consistent With Constraints
440 Allocate Resource
445 Update Load For Picked Device
450 Update δ For Picked Device
455 Last Request? No / Yes
460 Update π For Request Message
465 Stop

200

| | Request Message | |
|---|---|---|
| 210 | 0 | 20 VMs within 20 hops of requestor for 5 hours |
| 220 | 1 | 30 VMs near Chicago for 5 hours |
| 230 | 2 | 500 GB storage within 2 miles of {0} for 2 hours |
| 240 | ... | ... |

RESOURCE PLACEMENT IN NETWORKED CLOUD BASED ON RESOURCE CONSTRAINTS

TECHNICAL FIELD

Various exemplary embodiments disclosed herein relate generally to telecommunications networks.

BACKGROUND

Many cloud operators currently host cloud services using a few large data centers, providing a relatively centralized operation. In such systems, a requestor may request the use of one or more resources from a cloud controller which may, in turn, allocate the requested resources from the data center for use by the requestor. This centralized operation, however, may not be well suited for hosting various types of applications, such as those with strict delay or reliability requirements.

Distributed data center architectures, on the other hand, provide a larger number of smaller data centers that may be geographically distributed. The data centers may remain under the control of one or more cloud controllers through a network such as the Internet or carrier networks. Under such a distributed system, the effects of network propagation delay may be reduced by providing cloud resources that are closer to a requestor in terms of geographic or network distance than a centralized cloud may be able to provide.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a cloud controller for fulfilling a request for cloud resources, the method including one or more of the following: receiving, at the cloud controller, a request message including a first request for a first cloud resource; identifying a set of potential devices for providing the first cloud resource; calculating a plurality of weight values corresponding to at least a portion of the set of potential devices for providing the first cloud resource, wherein the plurality of weight values are calculated based on a plurality of delta values associated with the at least a portion of the set of potential devices; selecting a device based on the plurality of weight values to provide the first cloud resource; and updating the delta value associated with the selected device.

Various exemplary embodiments relate to a cloud controller for fulfilling a request for cloud resources, the cloud controller including one or more of the following: a network interface configured to receive a request message including a first request for a first cloud resource; and a resource allocator configured to: identify a set of potential devices for providing the first cloud resource, calculate at least one weight value for at least one device of the set of potential devices for providing the first cloud resource, wherein the at least one weight value is calculated based on a delta value associated with the at least one device, select a device based at least on the at least one calculated weight value to provide the first cloud resource, and update the delta value associated with the selected device.

Various embodiments are described wherein the step of selecting a device based on the plurality of weight values includes selecting a device having a greatest weight value of the plurality of weight values.

Various embodiments are described wherein: the first request is associated with at least one constraint; and the step of selecting a device having a greatest weight value includes selecting a device that has a greatest weight value among a subset of devices of the set of potential devices that satisfy the at least one constraint.

Various embodiments are described wherein the step of identifying a set of potential devices for providing the first cloud resource includes identifying a set of potential devices that all satisfy the at least one constraint.

Various embodiments are described wherein the at least one constraint includes a distance constraint.

Various embodiments are described wherein the step of updating the delta value associated with the selected device includes modifying a previous delta value based on a new committed capacity of the selected device.

Various embodiments are described wherein: the first request is associated with a set of requested time slots; at least one device of the set of potential devices is associated with a plurality of delta values, wherein at least one delta value of the plurality delta values is associated with a time slot; and the step of calculating a weight value for the at least one device of the set of potential devices comprises calculating a weight value based on a plurality of delta values associated with the device and associated with at least one time slot that belongs to the set of requested time slots.

Various embodiments are described wherein the first cloud resource includes a group of virtual machines.

Various embodiments are described wherein the request message further includes a second request for a second cloud resource, the method further including: identifying a set of potential devices for providing the second cloud resource; calculating a plurality of weight values corresponding to at least a portion of the set of potential devices for providing the first cloud resource, wherein the plurality of weight values are calculated based on a plurality of delta values associated with the at least a portion of the set of potential devices; selecting a device based on the plurality of weight values to provide the second cloud resource; and updating the delta value associated with the device selected to provide the second cloud resource.

Various exemplary embodiments relate to a method performed by a cloud controller for fulfilling a request for cloud resources, the method including one or more of the following: receiving, at the cloud controller, a request message including a first request for a first cloud resource; identifying a set of potential devices for providing the first cloud resource; calculating a plurality of weight values corresponding to at least a portion of the set of potential devices for providing the first cloud resource, wherein the plurality of weight values are calculated based on a plurality of delta value associated with the at least a portion of the set of potential devices; selecting a device based on the plurality of weight values to provide the first cloud resource; and updating the delta value associated with the selected device, wherein the delta value is updated using the formula $$\delta(i,t)\left[1+\frac{R(i,t)}{B(i,t)}\right]+\frac{1}{c-1}\frac{R(i,t)}{B(i,t)}\ \forall\, t\in T(r)$$

wherein δ represents a current delta value of a device for a timeslot, R represents a current load of a device for a timeslot, B represents a capacity of a device for a timeslot, T represents a set of timeslots associated with a request, i represents the selected device, r represents the first request for the first cloud resource, t represents a timeslot associated with the request for the cloud resource, and c represents a constant value.

Various embodiments are described wherein c is equal to an approximation of Euler's number.

Various embodiments are described wherein the step of calculating a plurality of weight values includes calculating a weight value using the formula $$N(r)[L(r)-\Sigma_{t\in T(r)}\delta(i,t)]$$

wherein N represents a number of cloud resources associated with a request for a cloud resource, and L represents a number of timeslots associated with a request for cloud resource.

Various embodiments are described wherein the request message includes a second request for a second cloud resource, further includes: identifying a set of potential devices for providing the second cloud resource; calculating a weight value for each device of the set of potential devices for providing the first second resource, wherein the weight value is calculated based on a delta value associated with the device; selecting a device having a greatest weight value to provide the second cloud resource; and updating the delta value associated with the selected device, wherein the delta value is updated using the formula $$\delta(i2,t)\left[1+\frac{R(i2,t)}{B(i2,t)}\right]+\frac{1}{c-1}\frac{R(i2,t)}{B(i2,t)}\ \forall\, t\in T(r2)$$

wherein i2 represents the device selected to provide the second cloud resource, and r2 represents the second request for a second cloud resource.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
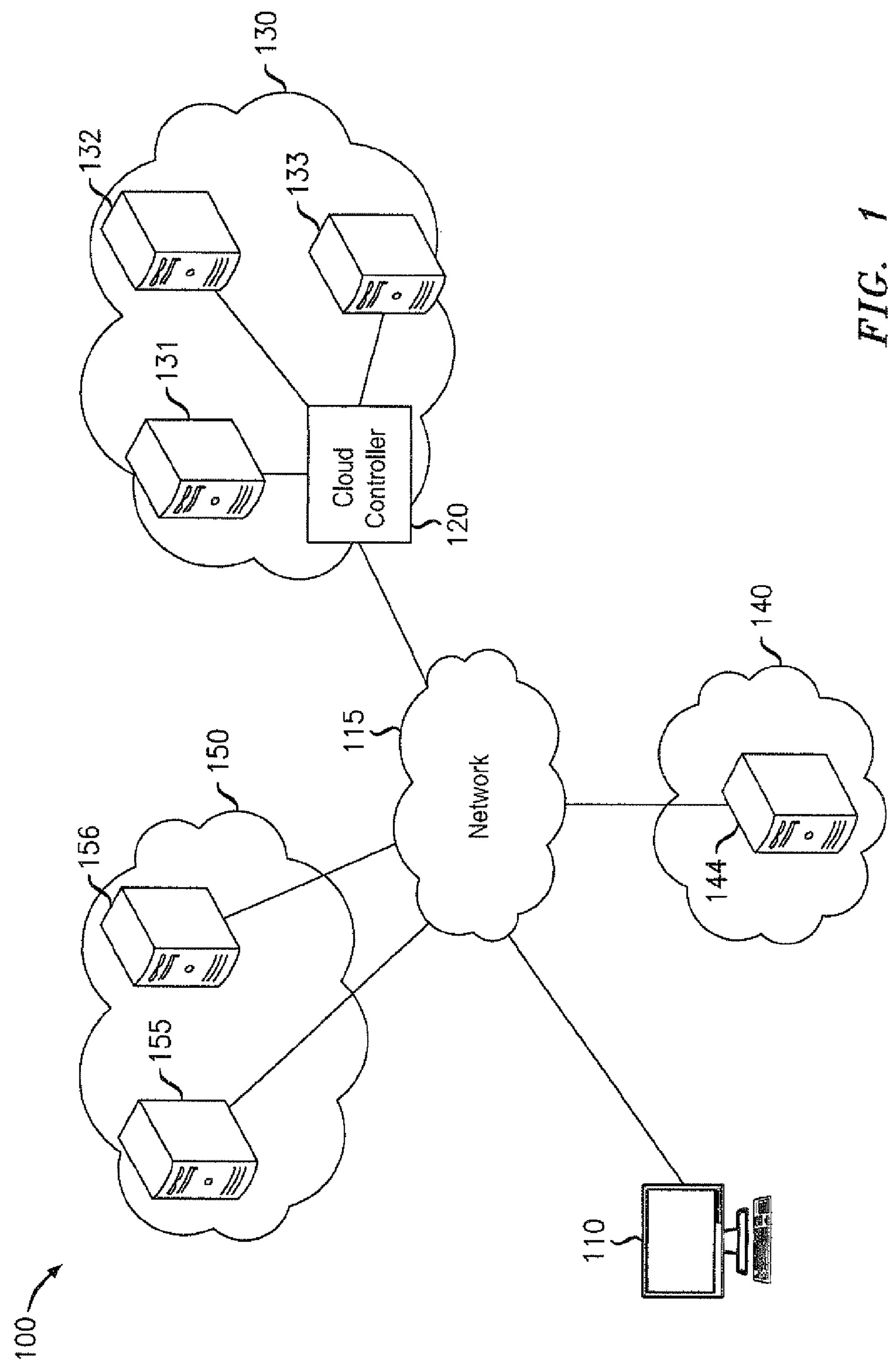
FIG. 1 illustrates an exemplary network for providing cloud resources.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Resource allocation in networked cloud environments may be more complex than similar tasks in centralized cloud environments. In a networked cloud, there are more choices of data centers where a requested resource may be allocated and more ways to connect the resources with various networking constraints. For example, customers may benefit from specifying geographic location preferences, network distance bounds, or cost limits. At the same time, the networked cloud operator may wish to maximize revenue or resource availability. Accordingly, providing a method and system capable of allocating resources in a networked cloud environment that meet user requested constraints while maximizing revenue and availability would be desirable.

Referring now to the drawings, in which like numerals refer to like components or steps, there are disclosed broad aspects of various exemplary embodiments.

FIG. 1 illustrates an exemplary network 100 for providing cloud resources. Network 100 may implement a networked cloud architecture and may include client device 110, network 115, cloud controller 120, and data centers 130, 140, 150.

Client device 110 may be any device configured to utilize one or more cloud resources. In various embodiments, client device may be a desktop computer, laptop, tablet, mobile device, server, or blade. Client device 110 may communicate with other devices, such as cloud controller 120, via network 115. Client device 110 may transmit a request for one or more cloud resources to cloud controller 120. For example, client device 110 may request the use of one or more virtual machines (VMs), groups of VMs, storage devices, or memory. Additional types of cloud resources will be apparent. After allocation of such resources by cloud controller 120, client device 110 may communicate with one or more of devices 131, 132, 133, 144, 155, 156 to utilize, access, or otherwise interface with the allocated cloud resources. Client device 110 may use such cloud resources for various reasons such as, for example, storing a media library, supplementing backend processing functions during periods of high demand, or wholly executing applications with which a user interacts via client device 110. It will be apparent that network 100 may include numerous additional client devices (not shown) that also make use of various cloud resources.

Network 115 may be any network of devices or transmission media capable of enabling communication between the various devices of exemplary network 100. For example, network 115 may include numerous devices configured to exchange and route data packets toward various destinations. In various embodiments, network 115 may include the Internet or one or more carrier networks.

Cloud controller 120 may be a device configured to control the operations of a networked cloud. Cloud controller 120 may reside at a data center, such as data center 130, or may reside elsewhere. Cloud controller 120 may perform various cloud management functions, including management of cloud resource allocation. As such, cloud controller 120 may receive requests for cloud resources from client devices such as client device 110. Upon receiving such requests, cloud controller may allocate requested resources from one or more of cloud devices 131, 132, 133, 144, 155,

156, for use by client devices. In various embodiments, exemplary network may include multiple cloud controllers (not shown). Various techniques for coordinating the operation of multiple cloud controllers will be apparent.

Data centers 130, 140, 150 may each be locations supporting one or more devices that provide cloud resources. For example, data center 130 may host cloud devices 131, 132, 133; data center 140 may host cloud device 144; and data center 150 may host cloud devices 155, 156. Data centers 130, 140, 150 may be geographically distributed or may be situated as different network distances from client device 110. For example, client device may be located in Washington, D.C., data center 140 may be located in New York, data center 150 may be located in Chicago, and data center 130 may be located in Seattle. According to this example, client device 110 may experience less network latency when communicating with data center 140 than when communicating with data center 130. It will be apparent that network 100 may include numerous additional data centers (not shown) and that each data center may include any number of cloud devices.

Each of cloud devices 131, 132, 133, 144, 155, 156 may be a device configured to provide cloud resources for use by client devices. In various embodiments, each of cloud devices 131, 132, 133, 144, 155, 156 may be a desktop computer, laptop, tablet, mobile device, server, or blade. Cloud devices 131, 132, 133, 144, 155, 156 may be configured to provide processing, storage, memory, VMs, or groups of VMs for use by client devices such as client device 110.

Figures 2, 3:
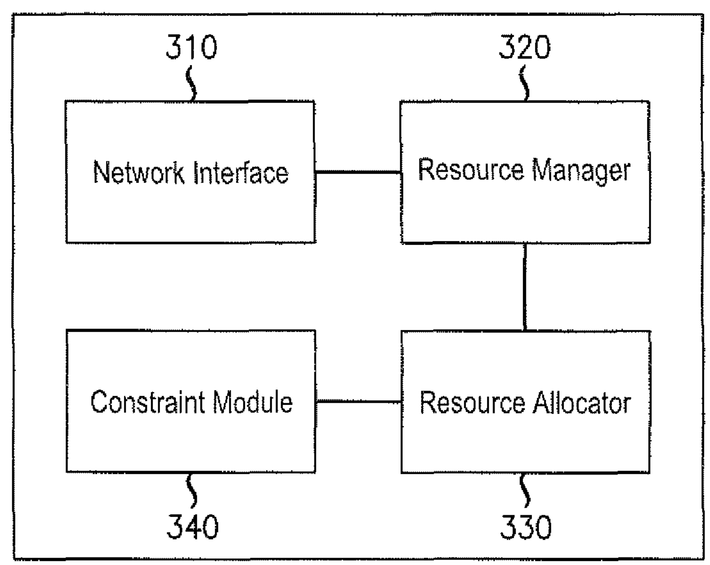
FIG. 2 illustrates an exemplary request message.
FIG. 3 illustrates an exemplary cloud controller.

FIG. 2 illustrates an exemplary request message 200. Request message may be sent by a client device, such as client device 110 of network 100, to a cloud controller, such as cloud controller 120 of network 100. It will be apparent that request message 200 may be a simplification or abstraction. For example, in various embodiments, request message may include headers and other data associated with various protocols such as TCP, UDP, or IP. Further, request message 200 may be formed and organized according to one or more protocols specific to a cloud API.

Request message 200 may include one or more requests 210-240 for cloud resources. Each request 210-240 may specify a requested cloud resource, requested time slots, or one or more constraints. The requested time slot may specify times or durations for which the cloud resource is requested. Constraints may specify various requirements for the cloud controller to follow when allocating the requested resources. For example, the request may include one or more distance constraints. Such distance constraints may specify that the device selected for allocating the requested cloud resource should be within some maximum geographic (e.g., number of miles) or network (e.g., number of hops) of the client, another allocated resource, or some other point of reference. Various additional types of constraints will be apparent such as, for example, specifying a maximum price for resource use or specifying a minimum guaranteed quality of service.

As an example, request 210 may be indexed as the $0^{th}$ request and may specify that a group of 20 virtual machines is requested for five one-hour-long time slots. It should be apparent that various embodiments may use different units for each time slot. For example, time slots may be broken into 30-minute intervals, in which case request 210 may request ten thirty-minute-long time slots. Request 210 may further specify a constraint that the resource should be allocated within 20 hops of the requesting client device.

As another example, request 220 of request message 200 may request a group of 30 VMs for 5 hours. Request 220 may also specify that this group of VMs should be allocated near the city of Chicago. In processing this constraint, the cloud controller may be configured to interpret the qualitative term "near" to mean, for example, within a specific or preconfigured distance to mean that the cloud controller should seek to allocate the resource as near to Chicago as possible or practicable.

As yet another example, request 230 may request the use of 500 GB of storage for two hours. Request 230 may also specify that a device should be chosen within two miles of any device allocated for the request having index 0. Thus, request 230 may specify that the allocated storage should be located within two miles of wherever the VM group associated with request 210 is allocated. Various alternative or additional features or methods of communicating requests, requested resources, time slots, and constraints will be apparent.

FIG. 3 illustrates an exemplary cloud controller 300. Cloud controller 300 may correspond to cloud controller 120 of network 100. It will be apparent that cloud controller 300 may constitute a simplification or abstraction. For example, while various illustrated components may include software, such software may be executed and otherwise supported by various hardware components. For example, cloud controller 300 may include various memories and one or more processors such as, for example, microprocessors, field-programmable gate arrays (FPGAs), or application-specific integrated circuit (ASICs). As illustrated, cloud controller 300 may include network interface 310, resource manager 320, resource allocator 330, or constraint module 340.

Network interface 310 may be an interface including hardware or executable instructions encoded on a machine-readable storage medium configured to communicate with at least one other network device, such as a client device or cloud device. Network interface 310 may include multiple physical ports for enabling communication with multiple devices. In various embodiments, network interface 310 may include one or more interfaces that communicate according to a protocol such as Ethernet, Frame Relay, ATM, or PPP. In operation, network interface 310 may receive and transmit various messages such as request messages and allocation instructions.

Resource manager 320 may include hardware or executable instructions on a machine-readable storage medium configured to manage the resources of a cloud architecture. Thus, resource manager 320 may transmit instructions to allocate and deallocate resources for use by various client devices. Resource manager 320 may also charge user accounts based on such allocations. Various additional functions for managing resources for performance by resource manager 320 will be apparent.

During operation, resource manager 320 may receive a request message, such as request message 200. After determining that one or more requests carried by the request message should be fulfilled (e.g., after ensuring user permissions to request the resources, ensuring sufficient credit to pay for the resources, or ensuring the availability of the requested resources) resource manager 320 may pass the requests to resource allocator to determine which physical cloud devices should be used to fulfill the request. After receiving an indication as to which cloud device should fulfill the request, resource manager may construct and transmit an instruction to that cloud device to provide the resources to the requesting client device. Resource manager may also transmit a response to the requesting client indicating the location of the allocated resources.

Resource allocator 330 may include hardware or executable instructions on a machine-readable storage medium configured to select an appropriate cloud device to provide a requested resource. In doing so, resource allocator may compute a weight value for each potential device for providing the resources. Resource allocator 330 may identify this set of potential devices by identifying all devices in the cloud network, identifying all devices having the capability to provide the resource, or by requesting from constraint module 340 an identification of all devices that fulfill the constraints specified in the request. According to various embodiments, the resource allocator may compute each weight according to the equation $$w(i)=N(r)[L(r)-\Sigma_{t\in T(r)}\delta(i,t)]$$

where w(i) may represent the calculated weight of allocating the resource at cloud device i. N(r) may represent the number of resources requested by the current request r, L(r) may represent the length of time for which the resources are requested by request r, and T(r) may represent the set of time slots t for which the resources are requested by request r.

This equation may also make use of a variable delta value associated with the cloud device i, represented above as δ(i,t). In various embodiments, each cloud device i may be associated with a different delta value for each time slot t. Upon initialization of the cloud or cloud controller 300, the delta value may be set to zero for each cloud device and time slot pair. Thereafter, resource allocator may modify the delta value each time resources are allocated to a cloud device for a time slot. An exemplary method of updating the delta value will be described in greater detail below.

After computing the weight for each cloud device, resource allocator 330 may select the cloud device that is associated with the greatest calculated weight to provide the requested resource. If resource allocator 330 has not yet already requested a constrained set of devices from constraint module 340, as may be the case in various embodiments, resource allocator 330 may make such a request at this point. According to such embodiments, resource allocator 330 may select the device having the greatest calculated weight that also belongs to the constrained set returned by constraint module 340. As such, resource allocator 330 may ensure that the cloud device selected to provide a resource meets the constraints specified in the request.

Once resource allocator 330 selects a cloud device to provide the requested resource, resource allocator may update a current load value for the device for the time slots associated with the request. According to various embodiments, resource allocator 330 may update the current load value according to the equation $$R(i,t)=R(i,t)+N(r)\forall t\in T(r)$$

where R(i,t) may represent the current load for a cloud device i for a time slot t.

Next, resource allocator 330 may update the delta value for the selected device for the time slots associated with the request. According to various embodiments, resource allocator 330 may update the delta value according to the equation $$\delta(i,t)=\delta(i,t)\left[1+\frac{R(i,t)}{B(i,t)}\right]+\frac{1}{c-1}\frac{R(i,t)}{B(i,t)}\ \forall\ t\in T(r)$$

where B(i,t) may represent the total capacity of a cloud device i for a time slot t and c may represent some constant value. In various embodiments, c may be set equal to an approximation of Euler's number. As will be known, Euler's number is approximately equal to 2.71828. The approximation used may be any approximation such as, for example, 3, 2.72, or 2.718. The ratio of current load to total capacity (R over B) may be referred to as a cloud device's committed capacity for a time slot.

In various embodiments, cloud controller may further maintain a pi value for each request message. This pi value may be used to gauge the performance of cloud controller in the future. In various embodiments, the pi value is not used in making the determination as to which cloud device should host a requested resource. According to various embodiments, cloud controller may calculate each pi value according to the equation $$\pi(m)=\Sigma_{i\in I}A(r,i)[L(r)-\Sigma_{t\in T(r)}\delta(i,t)]$$

where π(m) may represent the pi value for a request message in, i may represent the set of all cloud devices, and A(r,i) may represent the total number of resources allocated to a device i for a request message m.

In various embodiments, resource allocator 330 may maintain different delta and pi values for each type of cloud resource. For example, resource allocator 330 may maintain different delta and pi values for VMs and VM groups than resource allocator 330 maintains for storage. Various modifications to effect such functionality will be apparent.

Constraint module 340 may include hardware or executable instructions on a machine-readable storage medium configured to identify the set of devices that may meet a set of constraints. Constraint module 340 may receive requests or constraints extracted from requests from resource allocator 330. Thereafter, constraint module 340 may iterate through the list of all cloud devices to determine which cloud devices meet all constraints passed by the resource allocator 330. Then, constraint module 340 may return to resource allocator the set of cloud devices that meet the specified constraints.

Figure 4:
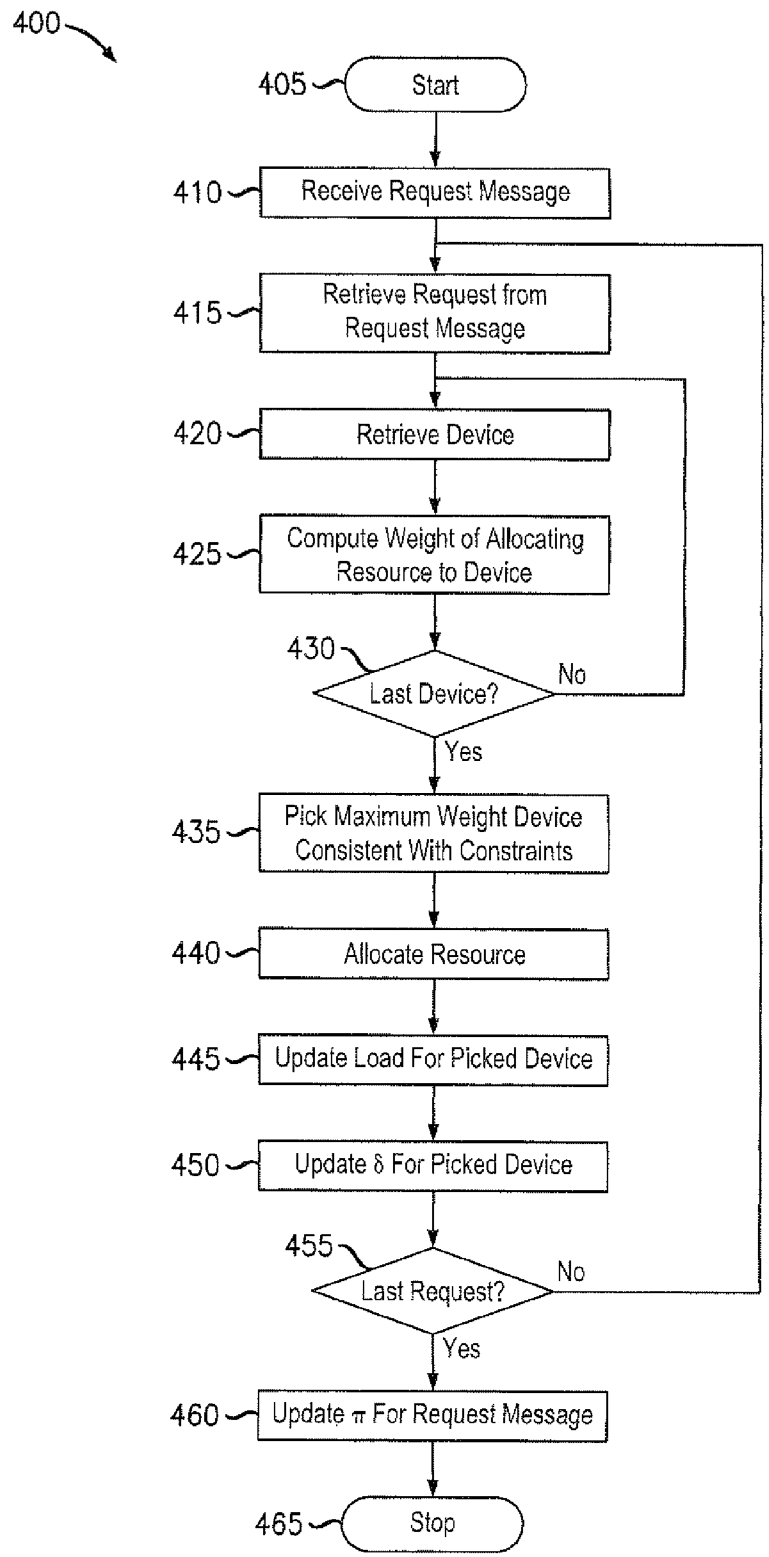
FIG. 4 illustrates an exemplary method for allocating cloud resources based on a received request message.

FIG. 4 illustrates an exemplary method 400 for allocating cloud resources based on a received request message. Method 400 may be implemented by the components of a cloud controller such as cloud controller 120 or cloud controller 300. For example, method 400 may be performed by resource manager 320, resource allocator 330, or constraint module 340.

Method 400 may begin in step 405 and proceed to step 410 where the cloud controller may receive a request message. Next, in step 415, the cloud controller may retrieve a request from the request message to allocate. Cloud controller may then begin iteratively computing weights for the potential devices for fulfilling the request by first retrieving a device to evaluate in step 415. This device may be selected, for example, from a set of all devices, from a set of devices capable of fulfilling the request, or from a set of devices that are consistent with any constraints specified in the request. Next, in step 425, the cloud controller may compute a weight of allocating the resource to the current device. For example, the cloud controller may utilize an equation such as that discussed above to compute a weight. Next, in step 430 the cloud controller may determine whether the current device is the last device from the appropriate set to evaluate. If additional devices remain to be evaluated, method 400 may loop back to step 420. Otherwise, method 400 may proceed to step 435.

In step 435, the cloud controller may select the device having the greatest weight that is also consistent with any constraints specified in the request. If the cloud controller only selected devices in step 420 that were consistent with the constraints, step 435 may include merely selecting the greatest calculated weight. In other embodiments, cloud controller may reference the set of devices that meet the constraints when selecting the device. In such embodiments, the device associated with the greatest weight calculated may not be selected if such device does not also appear in the set of devices that meet the constraints.

After selecting a device, the cloud controller may allocate the resource to the selected device in step 440 by sending an allocation instruction to that device. The cloud controller may then, in step 445, update a current load associated with the selected location. For example, the cloud controller may compute the current load based on the equations detailed above. Then, the cloud controller may update the delta value for the selected location in step 450. For example, the cloud controller may compute these delta and pi values based on the equations detailed above. Next, in step 455, the cloud controller may determine whether the request message includes additional requests to fulfill. If the current request is not the last request, method 400 may loop back to step 415. Otherwise, method 400 may proceed to calculate a pi value for the request message in step 460 and end in step 465.

Having described various exemplary systems, components, and methods, an example of the operation of exemplary system 100 will now be presented. Cloud controller 300 may correspond to cloud controller 120 and method 400 may be implemented in cloud controller 120, 300. The current delta values for the various devices and time slots may be indicated by the following table.

TABLE 1

| device | t0 | t1 | t2 | t3 | t4 | t5 |
|---|---|---|---|---|---|---|
| i1 131 | 0.125 | 0.125 | 0 | 0 | 0 | 0 |
| i2 132 | 0.1 | 0.1 | 0.1 | 0.1 | 0 | 0 |
| i3 133 | 0 | 0 | 0 | 0 | 0 | 0 |
| i4 144 | 0.5 | 0.5 | 0.5 | 0.5 | 0 | 0 |
| i5 155 | 0.8 | 0.8 | 0.8 | 0.4 | 0.4 | 0.1 |
| i6 156 | 0.25 | 0.25 | 0.25 | 0.25 | 0 | 0 |

Further, the total capacities (B(i,t)) of the cloud devices may be indicated by the following table

TABLE 2

| device | t0 | t1 | t2 | t3 | t4 | t5 |
|---|---|---|---|---|---|---|
| i1 131 | 500 | 500 | 500 | 500 | 500 | 500 |
| i2 132 | 100 | 100 | 150 | 150 | 150 | 150 |
| i3 133 | 1000 | 1000 | 1000 | 1000 | 1000 | 1000 |
| i4 144 | 250 | 250 | 250 | 250 | 250 | 0 |
| i5 155 | 500 | 500 | 500 | 500 | 500 | 500 |
| i6 156 | 100 | 100 | 100 | 100 | 100 | 100 |

The process may begin in step 410 where cloud controller 120, 300 receives request message 200. Next, in step 415, resource allocator 330 may extract request 210 from the request message 210. Next, in steps 420-430, resource allocator 330 may calculate weights for each of the cloud devices, as indicated in the following table.

TABLE 3

| device | weight |
|---|---|
| i1 131 | 95 |
| i2 132 | 92 |
| i3 133 | 100 |
| i4 144 | 60 |
| i5 155 | 36 |
| i6 156 | 80 |

For example, for cloud device 131, the resource allocator may calculate a weight of 95 by multiplying the number of resources requested (20) by the difference of the total length of the request 210 (5 hours) and the sum of the delta values for cloud device 131 over the next 5 hours (0.25). The weights for remaining devices 132, 133, 144, 155, 156 may be computed in a similar manner.

Next, in step 435, the resource allocator 330 may first request a set of constrained devices from constraint module 340. Constraint module may determine that only cloud devices 144, 155, 156 are located within 20 hops of client device 110. Then, resource allocator 330 may determine that device 156 is associated with the highest weight consistent with the constraints because "80" is greater than both "60" and "36." Cloud controller 120, 300 may then instruct cloud device 156 to establish a group of 20 VMs for use by client device 110. Next, in step 445, the resource allocator 330 may update the load (R(i,t)) for device 156, as indicated in the following table displaying the current loads of the cloud devices.

TABLE 4

| device | t0 | t1 | t2 | t3 | t4 | t5 |
|---|---|---|---|---|---|---|
| i1 131 | 150 | 150 | 0 | 0 | 0 | 0 |
| i2 132 | 7 | 7 | 7 | 7 | 0 | 0 |
| i3 133 | 0 | 0 | 0 | 0 | 0 | 0 |
| i4 144 | 150 | 150 | 150 | 150 | 0 | 0 |
| i5 155 | 460 | 460 | 460 | 200 | 200 | 30 |
| i6 156 | 50 | 50 | 50 | 50 | 20 | 0 |

Next, the resource allocator 330 may update the delta value associated with cloud device 156, for example, according to the equations discussed above. The new contents of the delta variable may be indicated by the following table.

TABLE 5

| device | t0 | t1 | t2 | t3 | t4 | t5 |
|---|---|---|---|---|---|---|
| i1 131 | 0.125 | 0.125 | 0 | 0 | 0 | 0 |
| i2 132 | 0.1 | 0.1 | 0.1 | 0.1 | 0 | 0 |
| i3 133 | 0 | 0 | 0 | 0 | 0 | 0 |
| i4 144 | 0.5 | 0.5 | 0.5 | 0.5 | 0 | 0 |
| i5 155 | 0.8 | 0.8 | 0.8 | 0.4 | 0.4 | 0.1 |
| i6 156 | 0.66 | 0.66 | 0.66 | 0.66 | 0.12 | 0 |

Cloud controller 120, 300 may then proceed to process the remaining requests 220, 230, 250 in a similar manner. Finally, in step 460, the cloud controller 120, 300 may calculate a pi value for the request message 200.

According to the foregoing, various embodiments enable the allocation of cloud resources in a networked cloud. For example, by utilizing the methods described herein, a cloud controller may implement a framework for efficiently allocating resources to maximize revenues and other performance metrics subject to clients constraints on factors such as cost and distance.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a cloud controller comprising a memory and a processor for fulfilling a request for cloud resources, the method comprising:

receiving, at the cloud controller, a request message including a first request for a first cloud resource;

identifying, by the cloud controller, a set of potential devices for providing the first cloud resource;

calculating, by the cloud controller, a plurality of weight values corresponding to at least a portion of the set of potential devices for providing the first cloud resource, wherein the plurality of weight values are calculated based on a plurality of delta values associated with the at least a portion of the set of potential devices;

selecting, by the cloud controller, a device based on the plurality of weight values to provide the first cloud resource; and updating, by the cloud controller, the delta value associated with the selected device, wherein the first request is associated with a set of requested time slots, at least one device of the set of potential devices is associated with the plurality of delta values, at least one delta value of the plurality of delta values is associated with a time slot, and the step of calculating the weight value for the at least one device of the set of potential devices comprises:

calculating a weight value based on the plurality of delta values associated with the device and associated with at least one time slot that belongs to the set of requested time slots.

2. The method of claim 1, wherein the step of selecting a device based on the plurality of weight values comprises selecting a device having a greatest weight value of the plurality of weight values.

3. The method of claim 1, wherein:

the first request is associated with at least one constraint; and the step of selecting a device comprises selecting a device among a subset of devices of the set of potential devices that satisfy the at least one constraint.

4. The method of claim 3, wherein the step of identifying a set of potential devices for providing the first cloud resource comprises identifying a set of potential devices that satisfy the at least one constraint.

5. The method of claim 3, wherein the at least one constraint includes a distance constraint.

6. The method of claim 1, wherein the step of updating the delta value associated with the selected device comprises modifying a previous delta value based on a new committed capacity of the selected device.

7. The method of claim 1, wherein the first cloud resource comprises a group of virtual machines.

8. The method of claim 1, wherein the request message further includes a second request for a second cloud resource, the method further comprising:

identifying a set of potential devices for providing the second cloud resource;

calculating a plurality of weight values corresponding to at least a portion of the set of potential devices for providing the first cloud resource, wherein the plurality of weight values are calculated based on a plurality of delta values associated with the at least a portion of the set of potential devices;

selecting a device based on the plurality of weight values to provide the second cloud resource; and updating the delta value associated with the device selected to provide the second cloud resource.

9. A cloud controller for fulfilling a request for cloud resources, the cloud controller comprising:

a network interface configured to receive a request message including a first request for a first cloud resource;

a memory; and a processor in communication with the network interface and the memory, the processor being configured to:

identify a set of potential devices for providing the first cloud resource, calculate at least one weight value for at least one device of the set of potential devices for providing the first cloud resource, wherein the at least one weight value is calculated based on a delta value associated with the at least one device, select a device based at least on the at least one calculated weight value to provide the first cloud resource, and update the delta value associated with the selected device, the first request is associated with a set of requested time slots, at least one device of the set of potential devices is associated with a plurality of delta values, wherein at least one delta value of the plurality of delta values is associated with a time slot; and in calculating a weight value for the at least one device of the set of potential devices, the processor is configured to calculate a weight value based on a plurality of delta values associated with the device and associated with at least one time slot that belongs to the set of requested time slots.

10. The cloud controller of claim 9, wherein the first request is associated with at least one constraint and the processor is further configured to identify a set of devices that satisfy the at least one constraint.

11. The cloud controller of claim 10, wherein the processor uses the identified set of devices as the set of potential devices for providing the first cloud resource.

12. The cloud controller of claim 10, wherein the at least one constraint includes a distance constraint.

13. The cloud controller of claim 9, wherein, in updating the delta value associated with the selected device, the processor is configured to modify a previous delta value based on a new committed capacity of the selected device.

14. The cloud controller of claim 9, wherein the first cloud resource comprises a group of virtual machines.

15. The cloud controller of claim 9, wherein the request message further includes a second request for a second cloud resource, the processor being further configured to:

identify a set of potential devices for providing the second cloud resource;

calculate at least one weight value for at least one device of the set of potential devices for providing the second cloud resource, wherein the at least one weight value is calculated based on a delta value associated with the device;

select a device based on the at least one weight value to provide the second cloud resource; and update the delta value associated with the device selected to provide the second cloud resource.

16. A method performed by a cloud controller including a processor and a memory for fulfilling a request for cloud resources, the method comprising:

receiving, at the cloud controller, a request message including a first request for a first cloud resource;

identifying, by the cloud controller, a set of potential devices for providing the first cloud resource;

calculating, by the cloud controller, a plurality of weight values corresponding to at least a portion of the set of potential devices for providing the first cloud resource, wherein the plurality of weight values are calculated based on a plurality of delta value associated with the at least a portion of the set of potential devices;

selecting, by the cloud controller, a device based on the plurality of weight values to provide the first cloud resource; and updating, by the cloud controller, the delta value associated with the selected device, wherein the delta value is updated using the formula $$\delta(i,t)\left[1+\frac{R(i,t)}{B(i,t)}\right]+\frac{1}{c-1}\frac{R(i,t)}{B(i,t)}\ \forall\, t\in T(r)$$

wherein δ represents a current delta value of a device for a timeslot, R represents a current load of a device for a timeslot, B represents a capacity of a device for a timeslot, T represents a set of timeslots associated with a request, i represents the selected device, r represents the first request for the first cloud resource, t represents a timeslot associated with the request for the cloud resource, and c represents a constant value.

17. The method of claim 16, wherein c is equal to an approximation of Euler's number.

18. The method of claim 16, wherein the step of calculating a plurality of weight values comprises calculating a weight value using the formula $$N(r)[L(r)-\Sigma_{t\in T(r)}\delta(i,t)]$$

wherein N represents a number of cloud resources associated with a request for a cloud resource, and L represents a number of timeslots associated with a request for cloud resource.

* * * * *